(12) United States Patent
Guha et al.

(10) Patent No.: US 10,558,369 B2
(45) Date of Patent: Feb. 11, 2020

(54) FLASH DEVICE LIFETIME MONITOR SYSTEMS AND METHODS

(71) Applicant: QUALCOMM INCORPORATED, San Diego, CA (US)

(72) Inventors: Valmick Guha, Hyderabad (IN); Narasimhan Agaram, Hyderabad (IN); Ranjith Kumar Narahari, Hyderabad (IN); Dexter Chun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 190 days.

(21) Appl. No.: 15/077,879

(22) Filed: Mar. 22, 2016

(65) Prior Publication Data

US 2017/0220268 A1  Aug. 3, 2017

Related U.S. Application Data

(60) Provisional application No. 62/289,429, filed on Feb. 1, 2016.

(51) Int. Cl.
*G06F 3/06* (2006.01)
*G06F 12/02* (2006.01)

(52) U.S. Cl.
CPC .......... *G06F 3/0616* (2013.01); *G06F 3/0649* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 7,577,787 B1 * | 8/2009 | Yochai | G06F 12/0804 711/113 |
| 8,745,311 B2 | 6/2014 | Tzeng | |
| 9,063,825 B1 | 6/2015 | Bao | |
| 9,690,696 B1 * | 6/2017 | Hefner | G06F 12/0246 |
| 9,766,980 B1 * | 9/2017 | Anantharaman | G06F 11/1092 |

(Continued)

OTHER PUBLICATIONS

Kan Zhong et al., "Building High-Performance Smartphones via Non Volatile Memory: The Swap Approach," EMSOFT-2014,Oct. 12-17, 2014.

(Continued)

*Primary Examiner* — Sean D Rossiter
*Assistant Examiner* — Stephanie Wu
(74) *Attorney, Agent, or Firm* — Smith Tempel Blaha LLC

(57) ABSTRACT

Systems and methods are disclosed for ensuring a target lifetime of a memory device coupled to an SoC of a computing device, the SoC including a central processing unit (CPU) executing an operating system (O/S). A DRAM is coupled to the SoC, and the memory device is configured to receive page swaps from the DRAM. A swap lifetime controller (SLC) in communication with the O/S is configured to determine a number of page swaps for the memory device during a time interval. A learning prediction system (LPS) in communication with the SLC is configured to determine a target number of page swaps (target_swap) to the memory device and a remaining life of the memory device (remaining_life_of_device). The SLC determines the number of page swaps based on the target_swap and remaining_life_of_device.

30 Claims, 10 Drawing Sheets

(56) References Cited

U.S. PATENT DOCUMENTS

| | | | |
|---|---|---|---|
| 2010/0011260 A1* | 1/2010 | Nagadomi | G06F 11/008 |
| | | | 714/704 |
| 2011/0099320 A1* | 4/2011 | Lucas | G06F 3/0616 |
| | | | 711/103 |
| 2012/0066439 A1* | 3/2012 | Fillingim | G06F 11/3485 |
| | | | 711/103 |
| 2012/0185638 A1 | 7/2012 | Schreiber et al. | |
| 2013/0254511 A1 | 9/2013 | Das et al. | |
| 2014/0317373 A1* | 10/2014 | Kim | G11C 16/349 |
| | | | 711/167 |
| 2015/0106556 A1* | 4/2015 | Yu | G11C 16/349 |
| | | | 711/103 |
| 2015/0106557 A1 | 4/2015 | Yu et al. | |
| 2015/0378764 A1* | 12/2015 | Sivasubramanian | |
| | | | G06F 9/45558 |
| | | | 718/1 |
| 2016/0062915 A1* | 3/2016 | Matsumura | G06F 12/122 |
| | | | 711/119 |
| 2016/0216900 A1* | 7/2016 | Satou | G06F 3/0616 |
| 2017/0131947 A1* | 5/2017 | Hoang | G06F 3/0653 |
| 2017/0228161 A1* | 8/2017 | Nangoh | G06F 3/0604 |

OTHER PUBLICATIONS

Dawoon Jung et al., "A Flash-Aware Swap System," JProc. of International Workshop on Software Support for Portable Storage FASS 2005.

International Search Report and Written Opinion—PCT/US2017/015182—ISA/EPO—dated Apr. 12, 2017.

* cited by examiner

FLASH DEVICE LIFETIME MONITOR SYSTEMS AND METHODS

REFERENCE TO RELATED APPLICATION

This application claims priority under 35 U.S.C. § 119(e) to U.S. Provisional Patent Application Ser. No. 62/289,429, filed Feb. 1, 2016, the entire contents of which are hereby incorporated by reference.

DESCRIPTION OF THE RELATED ART

Personal computing devices comprising at least one processor are ubiquitous. Such computing devices may include desktop computers, laptop computers, cellular telephones, smart phones, tablet computers, portable digital assistants (PDAs), portable game consoles, and wearable computers. Many computing devices include dynamic random access memory (DRAM). Because DRAM is an expensive commodity, means of expanding the virtual memory for computing devices, including portable computing devices (PCDs) like mobile phones, have been developed. Swapping pages is a standard method for increasing the memory capacity of PCDs without adding DRAM.

Four kilobyte pages may be swapped to disk, flash, or compressed and then stored into a portion of the DRAM itself using various algorithms, collectively referred to herein as zRAM. However, using zRAM to compress pages and store them back on the DRAM results in less non-compressed portions of DRAM being available, resulting in performance degradation if overused. Since NAND flash is about 1/10th the cost of DRAM, NAND flash devices are one of the preferred memories for such page swaps to expand virtual memory.

However, NAND flash cells can only be erased and programmed a finite number of times before they no longer retain charge state (i.e. 0 or 1). Therefore, page swaps to flash memory devices cannot be used aggressively or it will destroy the device, resulting in the flash device and the PCD becoming inoperable. The prior art has attempted to address this problem by conservatively applying virtual memory expansion, such as reducing flash page swaps so that they occurs only during severe DRAM shortages (i.e. less frequently).

Alternatively, larger flash devices may be used so that the wear is spread out over a larger number of NAND flash cells. Further, a flash device may be used in single-level-cell mode since single-level-cell mode provides greater endurance than multi-level-cell mode. However, such methods cannot ensure that a flash device remains operable over the desired lifetime.

What is needed are methods and systems that regulate the use of flash device page swaps and/or zRAM page swaps in a manner that maximizes performance while ensuring a predetermined target flash device lifetime.

SUMMARY OF THE DISCLOSURE

Systems and methods are disclosed for ensuring a target lifetime of a memory device coupled to a system-on-a-chip (SoC) of a computing device. In an embodiment, a system comprises an SoC of the computing device, the SoC comprising a central processing unit (CPU) executing an operating system (OAS). A dynamic random access memory (DRAM) is coupled to the SoC. The memory device is coupled to the SoC and the memory device is configured to receive page swaps from the DRAM. The system further comprises a swap lifetime controller (SLC) in communication with the O/S, the SLC configured to determine a number of page swaps for the memory device during a first time interval. A learning prediction system (LPS) is in communication with the SLC, the LPS configured to determine a target number of page swaps (target_swap) to the memory device and a remaining life of the memory device (remaining_life_of_device). The SLC determines the number of page swaps based on the target_swap and remaining_life_of_device received from the LPS.

Another embodiment is a method for ensuring a target lifetime for a memory device electrically coupled to a system-on-a-chip (SoC) of a computing device. The method comprises receiving at a swap lifetime controller (SLC) of the SoC: a trigger from an operating system (O/S) of the SoC, a measured value of data page writes (total_data) to a memory device electrically coupled to the SoC, a measured value of swap page writes (total_swap) from a dynamic random access memory (DRAM) electrically coupled to the SoC to the memory device, and an age of the memory device (age_of_device). The method further comprises receiving at the SLC a target number of page swaps (target_swap) to the memory device and a remaining life of the memory device (remaining_life_of_device) from a learning prediction system (LPS) in communication with the SLC. In the method, a determination is made by the SLC of a number of page swaps for the memory device during a first time interval based on the target_swap and remaining_life_of_device received from the LPS.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
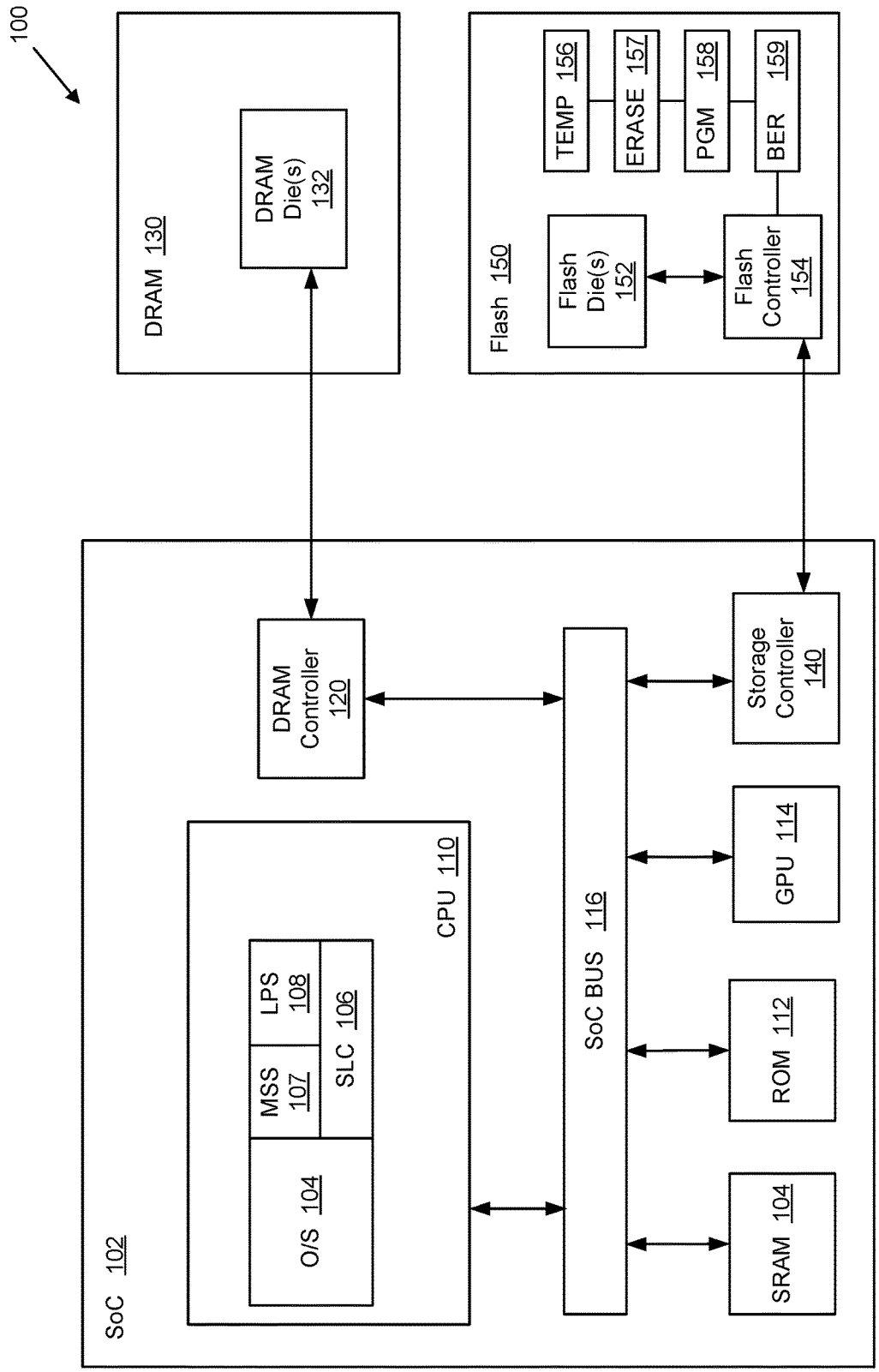
FIG. 1 illustrates aspects of an exemplary embodiment of a computing device in which flash device lifetime monitoring may be provided.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, film ware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Memory accesses in computing devices, including portable computing devices (PCDs), and especially memory accesses by a system on a chip (SoC) and a memory located external to the SoC ("off chip") occur via a high performance access channel. Data is transferred between a processor (or another component of the PCD) and one or more memory device over the access channel. A variety of standards, protocols, or technologies may be used to perform the transfer of the data, including different standards or protocols for different memory devices of, or connected to, the SoC. This disclosure is not limited to any particular data transfer standard or methodology. Additionally, the memory devices discussed herein may be any memory device, such as for example a random access memory device. Random access memory devices may include dynamic random access memory (DRAM) like a double data rate synchronous dynamic (DDR) RAM according to one of the DDRx or LPDDRx (Low Power DDR) standards, or as well as a NAND ("Flash") memory device.

In such memory devices, information content is stored in the form of electrons in tiny capacitors of one or more die(s) inside the memory devices. The presence of the electrons is interpreted as a data value of "1" and the absence of the electrons as a data value of "0" and these dies may be programmed and reprogrammed multiple times. DRAM is among the top performing solutions for providing virtual memory for computing devices, and in particular PCDs. However, DRAM is expensive. In order to maximize the amount of memory available for processes operating on a PCD, it is common to swap memory (such as using the kernel to swap "pages" of memory) associated with an inactive or lower priority process operating on the PCD for pages associated with an active or higher priority process operating on the PCD. Kernel as used herein can refer to the Linux kernel or any other operating system kernel. Pages as used herein can refer to any size or unit of memory, including 4096 byte (4 kilobyte) pages used in Linux.

Such page swapping may consist of taking pages, compressing them, and then storing the compressed pages back into a portion of the DRAM itself using various algorithms (collectively referred to herein as zRAM). Such compressing and storing in zRAM frees up some of the DRAM memory for pages associated with active processes. However, excessive swapping of pages to zRAM causes increasing portions of the DRAM to be taken up with compressed pages, resulting in less DRAM being available for the active processes.

Additionally, separate cheaper memory devices such as Flash memory devices or modules may be used for page swapping to store the pages associated with inactive or lower priority processes operating on the PCD. However, Flash memory has a limited lifetime or number of times that it may be erased and programmed before the Flash memory can no longer retain the charge state (i.e. 0 or 1). Flash memory is also used by the PCD to store various media and/or applications on the PCD. Thus, excessive page swapping to a Flash memory can result in a decreased lifetime for the Flash memory, and may result in the Flash memory and therefore the PCD being unusable well before the targeted or advertised lifetime for the Flash memory and/or PCD.

The systems and methods of the present disclosure allow for the use of page swaps to be monitored and regulated—whether to a Flash memory and/or to zRAM—in a manner that maintains performance levels for the PCD while also ensuring a predetermined target lifetime for the Flash memory. FIG. 1 illustrates one exemplary embodiment of a computing device or system 100 in which flash memory lifetime monitoring may be provided. The system 100 may be any computing device, including a personal computer, a workstation, a server, a PCD (such as a cellular telephone), a portable digital assistant (PDA), a portable game console, a tablet computer, or a wearable computer.

The exemplary system 100 includes a system on chip (SoC) 102 with an operating system (O/S) 104, a central processing unit (CPU) 110, static Random Access Memory (SRAM) 104, and a read-only memory (ROM) 112. In the embodiment illustrated in FIG. 1, the O/S 104 is contained within the CPU 110. The CPU 110 and O/S 104 may comprise a "core" of the SoC 102. In other embodiments, the O/S 104 may not be part of the CPU 110, and may instead be located on the SoC 102 separate from the CPU 110. The CPU 110, SRAM 104, and ROM 112 are coupled together by an SoC bus 116. In some embodiments, the SoC 102 may also include one or more additional processors like graphical processing unit (GPU) 114 also connected to the SoC bus 116.

The CPU 110 may be controlled by or execute the O/S 104, which may be a High Level Operating System (HLOS), to cause the CPU 110 to operate or execute various applications, programs, processes, or code stored in one or more memory of the computing device. In some embodiments the CPU 110 and GPU 114 may be the same type of processor, while in other embodiments the GPU 114 may be a digital signal processor (DSP), an analog processor, or other type of processor different from CPU 110 executing the O/S 104.

The CPU 110 and SoC 102 depicted in FIG. 1 are for illustrative purposes and may include more, or fewer, components that illustrated in FIG. 1 in different embodiments. The CPU 110 and/or SoC 102 may in other embodiments include one or more cache memory (not illustrated) including an L2, L3, or other desired cache. Additionally, such cache memory (or memories) may be dedicated to one processor, such as CPU 110, or may be shared among multiple processors in various embodiments, such as the CPU 110 and GPU 114 illustrated in FIG. 1.

The illustrated SoC 102 further includes a DRAM Controller 120 and Storage Controller 140, both electrically connected to the SoC bus 116. As illustrated, the DRAM Controller 120 is also electrically connected to one or more DRAM memory devices (DRAM 130) by memory access channel(s), which may be serial channel(s) or parallel channel(s) in various embodiments. Similarly, the Storage Controller 140 is also electrically connected to one or more memory devices or modules 150, illustrated as a Flash memory device or module (referred to herein as "Flash 150"). The Storage Controller 140 may be electrically connected to Flash 150 by memory access channel(s), which may be serial channel(s) or a parallel channel(s) in various embodiments. Although only a single DRAM 130 and Flash 150 are depicted in FIG. 1, other embodiments may include multiple DRAM 130 memory devices and/or multiple Flash 150.

Each of DRAM Controller 120 and Storage Controller 140 manages the data read from and/or stored to their respective memory devices DRAM 130/Flash 150 during operation of the system 100. In the embodiment of FIG. 1, the DRAM Controller 120 and Storage Controller 140 are separate components or modules on the SoC 102. In other embodiments these components may be combined into a single memory controller. Additionally, each of the DRAM Controller 120 and Storage Controller 140 may include other portions or components not illustrated such as read and/or write buffers, control logic, counters, etc., to allow the DRAM Controller 120 and Storage Controller 140 to control the data transfer over their respective memory access channels. In various implementations, some or all of the components of the DRAM Controller 120 and/or Storage Controller 140 may be implemented in hardware, software, or firmware as desired.

As illustrated in FIG. 1, the DRAM Controller 120 of SoC 102 is electrically coupled to the DRAM 130, and more particularly to one or more DRAM die(s) 132 on DRAM 130. In the illustrated embodiment the DRAM 130 is external to the SoC 102 or "off chip". In other embodiments the DRAM 130 may instead be located on the SoC 102. Similarly, the Storage Controller 140 of SoC 102 is electrically coupled to the Flash 150, and more particularly to a Flash Controller 154 that exists on the Flash 150. In the illustrated embodiment the Flash 150 is external to from the SoC 102 or off chip. In other embodiments the Flash 150 may instead be located on the SoC 102.

The Flash Controller 154 of the Flash 150 may be coupled to one or more Flash Die(s) 152. In an embodiment, the Flash Die(s) 152 may be logically partitioned into a data portion to store data pages (such as media, programs, applications, etc.) and a swap portion to store kernel swap pages. This logical partition of the Flash Die(s) 152 may be maintained by the Flash Controller 154, and in an embodiment may only be maintained while page swaps to the Flash 150 are allowed as discussed below.

Additionally, the Flash Controller 154 may be coupled to one or more monitoring modules, monitoring sensors, or monitoring logic on the Flash 150. In the illustrated embodiment, the Flash Controller 154 is electrically coupled to a temperature monitoring module (TEMP 156) that monitors an operating temperature of the Flash 150. The Flash Controller 154 is also electrically coupled to a total block erase count module (ERASE 157) which monitors how many pages of data have been erased from the Flash 150. The Flash Controller 154 is electrically coupled to a total page programming count module 158 which monitors how many pages of data have been programmed or written to the Flash 150. Finally, the Flash Controller 154 is electrically coupled to a block error rate module (BER 159) which monitors an error rate for accesses to the Flash 150.

In various embodiments, more or fewer monitoring modules/sensors/logic may be present on the Flash 150 and/or may be arranged differently than illustrated in FIG. 1. As discussed below, the Flash Controller 154 may at various times obtain and/or sample data about the operational status of the Flash 150 from one or more of the TEMP 156, ERASE 157, PGM 158 and BER 159 modules and pass the retrieved information or data to the Storage Controller 140. The Storage Controller 140 may in turn store this data or information about the operational status about the Flash 150 memory and/or pass on this data or information to the O/S 104 or other component of the SoC 102, such as the SLC 106, as discussed below.

The system 100 of FIG. 1 also includes a Swap Lifetime Controller or module (SLC 106), a Multi-Swap System or module (MSS 107) and a Learning and Predicting System or module (LPS 108) in communication with the O/S 104. The SLC 106, acting with and/or according to data received from the MSS 107 and LPS 108, monitors and regulates the page swaps performed by the O/S 104. This operation of the SLC 106 throttles or regulates the pages swaps to the Flash 150 based on the usage of the system 100 and the usage of the Flash 150, ensuring a predictable lifetime for the Flash 150.

The SLC 106, MSS 107, and LPS 108 may be arranged differently than illustrated in FIG. 1. For example, in some embodiments, only the SLC 106 will be directly in communication with the O/S 104, while each of the MSS 107 and LPS 108 will be in communication with, and will receive information from/provide information to the SLC 106. Additionally, although illustrated as separate from the O/S 104, one or more of the SLC 106, MSS 107, or LPS 108 may be part of or contained in O/S 104. Similarly, although illustrated in FIG. 1 as being part of the CPU 110, one or more of the SLC 106, MSS 107, or LPS 108 may be located elsewhere on the SoC 102, remote from CPU 110.

Figure 2:
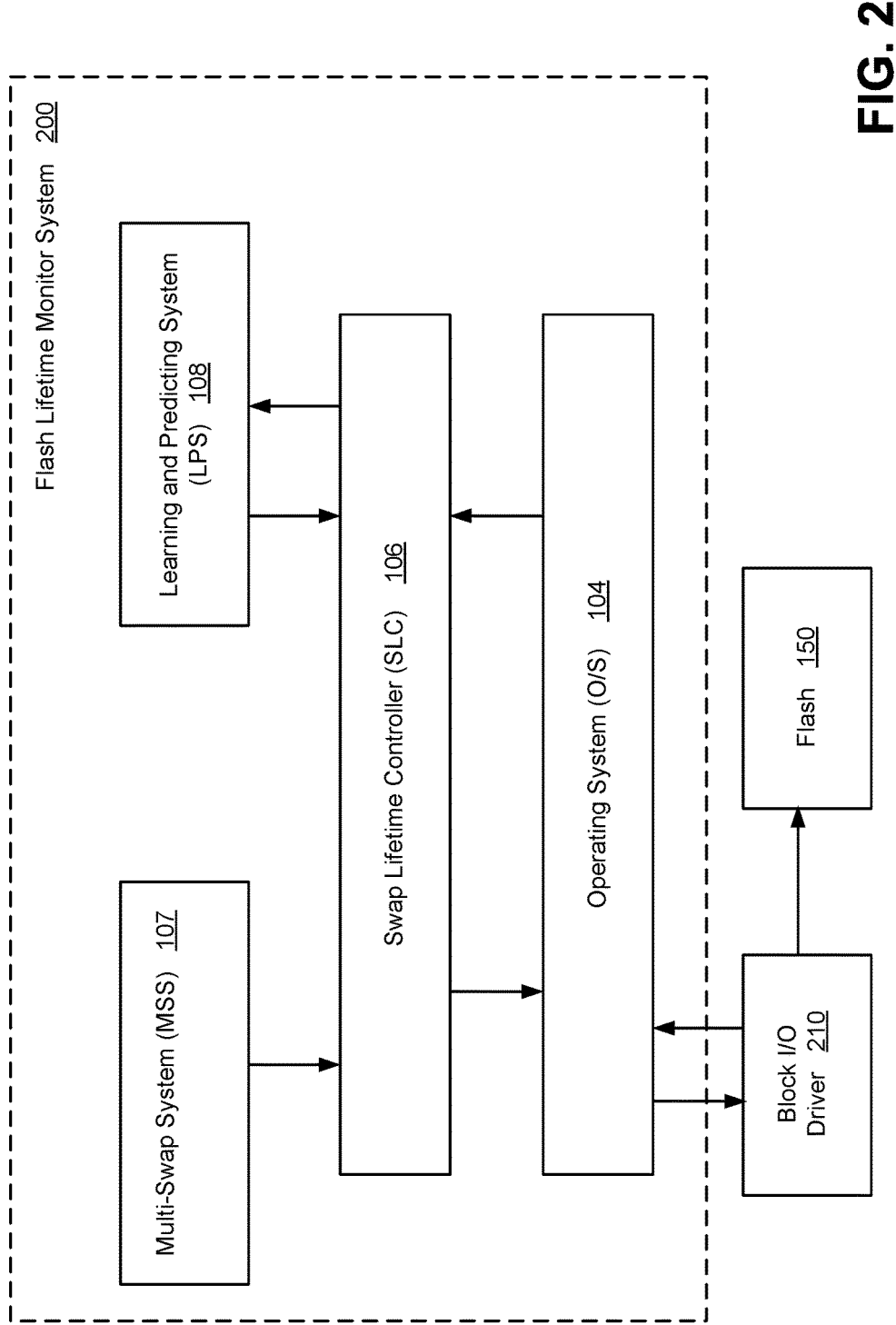
FIG. 2 illustrates exemplary interactions of components of the embodiment of FIG. 1 forming a system for flash device lifetime monitoring.

Turning to FIG. 2, exemplary interactions of components of the embodiment of FIG. 1 forming a Flash Lifetime Monitor System 200 are illustrated. This system 200 may perform various methods for monitoring and regulating the lifetime of one or more Flash 150 devices or modules (illustrated as Flash 150 in FIG. 2). The SLC 106 monitors the actual page swaps being performed by the O/S 104 as well as other information and data about the Flash 150. In some embodiments the Flash 150 may comprise multiple different flash devices or modules, and the SLC 106 may monitor this information for each flash device or module. The other information and data monitored by the SLC 106 can include temperature information from the TEMP 156 module, total block erase count from the ERASE 157 module, total page programming count from the PGM 158 module, and/or total block erase count from the BER 159 module (see FIG. 1). This information or data may be retrieved by the SLC 106 directly from the Storage Controller 140 and/or may be received by the SLC 106 from the O/S 104 as illustrated in FIG. 2.

The SLC 106 also receives input from the MSS 107. The MSS 107 provides information to ensure that the performance of the PCD is not unduly impacted by the regulation or throttling of page swaps. For example, in an embodiment, the MSS 107 may provide prioritization information about which available memory devices for receiving page swaps should be used first—e.g. whether to use zRAM or one or more Flash 150 for page swaps and/or which among multiple Flash 150 should be used first. This prioritization may be static and pre-determined, or may by dynamic and calculated or determined by the MSS 107 based on operational events or triggers.

Similarly, the MSS 107 may provide information about the preferred mechanism for placing page swaps among multiple possible recipient devices (whether zRAM or Flash 150), such as round robin (e.g. completely filling the first priority device with page swaps before turning to the next priority device) or a multiple swap system (e.g. placing a first "X" page swaps in the first priority device, the next "X" page swaps in the second priority device, etc.), or some other method.

The SLC 106 also receives information from the LPS 108. As discussed below, the LPS 108 periodically obtains information about how long memory devices, such as Flash 150, have been operating (device age) and the number of data writes to the memory devices—whether from page swaps or the user of the device placing other data into the memory device and evaluates the usage of the memory device over time. Based on this information, the LPS 108 predicts or determines the useful life left in each memory device, and provides this information to the SLC 106, along with a calculated target number of writes to each memory device that will ensure the desired or target total lifetime for each memory device, such as Flash 150.

Based on the operational information received from the O/S 104 (and/or other components of the PCD), the performance information received from the MSS 107, and the prediction information/write targets received from the LPS 108, the SLC 106 makes determinations as to the number of page swaps to allow over a time period, at what rate the page swaps should be made, and to which device(s) the page swaps should be sent. The SLC 106 may use various algorithms, formulas, tables, etc. to make these determinations.

The SLC 106 then causes the O/S 104 to perform the page swaps in accordance with these determinations and the SLC 106 sets a timer to wake up and/or perform a new set of determinations after the time period. When the timer expires O/S 104 wakes up the SLC 106, and the SLC 106 makes a new set of determinations based on updated operational information, updated performance information from the MSS 107, and updated prediction information/write targets from the LPS 108. Thus, the SLC 106 in combination with the MSS 107 and LPS 108 can monitor and reduce/increase the number of page swaps to one or more memory device, such as Flash 150, depending on the on-going use of the memory device during operation of the computing device (FIG. 1) which may be a PCD. In this manner, the system 200 of FIG. 2 ensures both performance of the PCD and an acceptable total lifetime for the Flash 150.

Figure 3A:
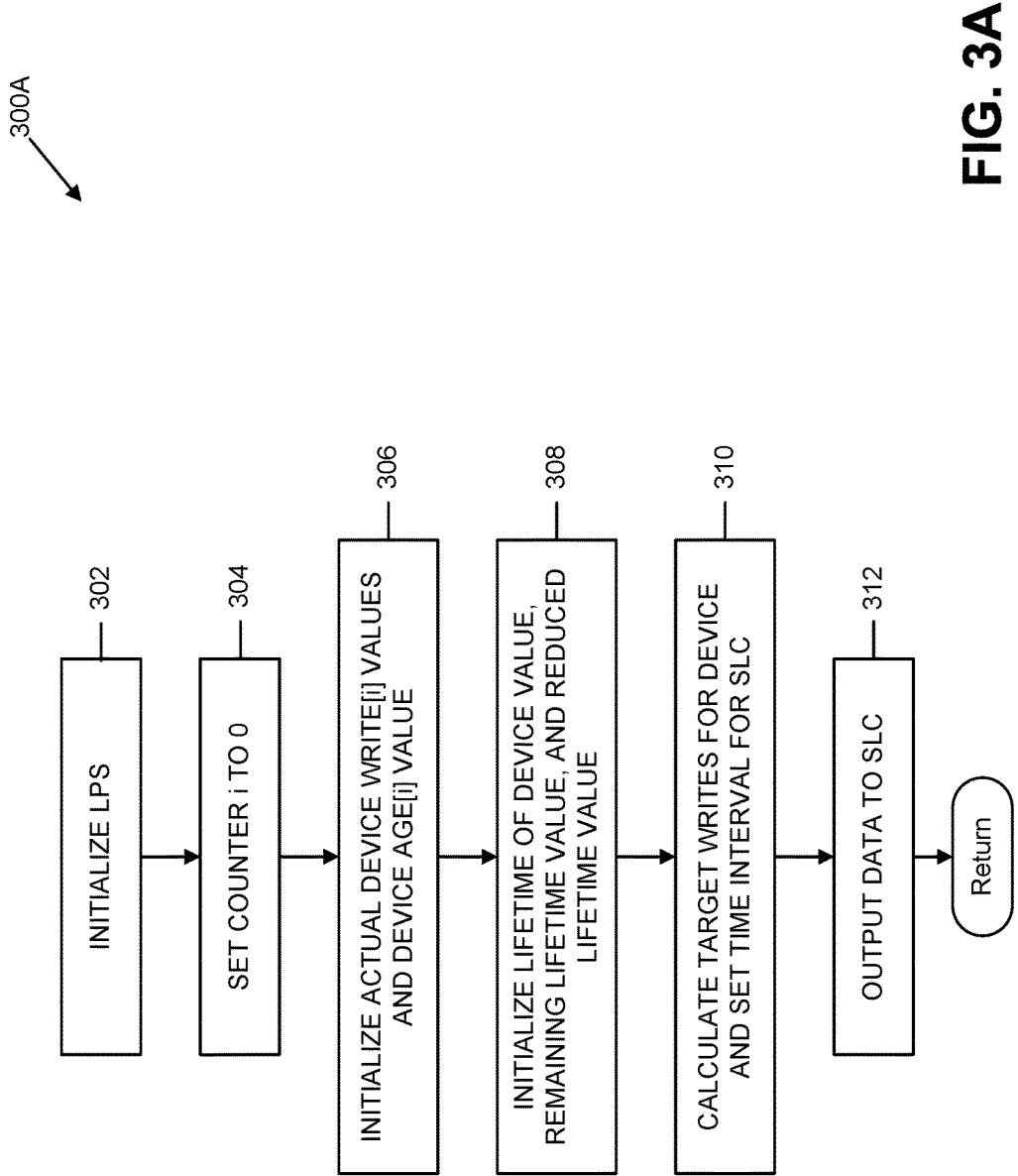
FIG. 3A is a flow chart illustrating exemplary steps of an initialization method performed by the Learning and Predicting System module (LPS) illustrated in FIG. 1.

Turning to FIG. 3, exemplary steps of an initialization method 300A performed by the LPS 108 controller or module (see FIGS. 1 and 2) is illustrated. In block 302 the LPS 108 is initialized. Initialization may occur automatically as part of an initialization of the computing device (100 of FIG. 1) in which the LPS 108 resides. In other embodiments, the initialization may be a subroutine or branch of another parent method, such as method 3009 of FIG. 39, in which case block 302 would occur after some determination (not shown in FIG. 39) that the parent method 300B is iterating for the first time.

Figure 3B:
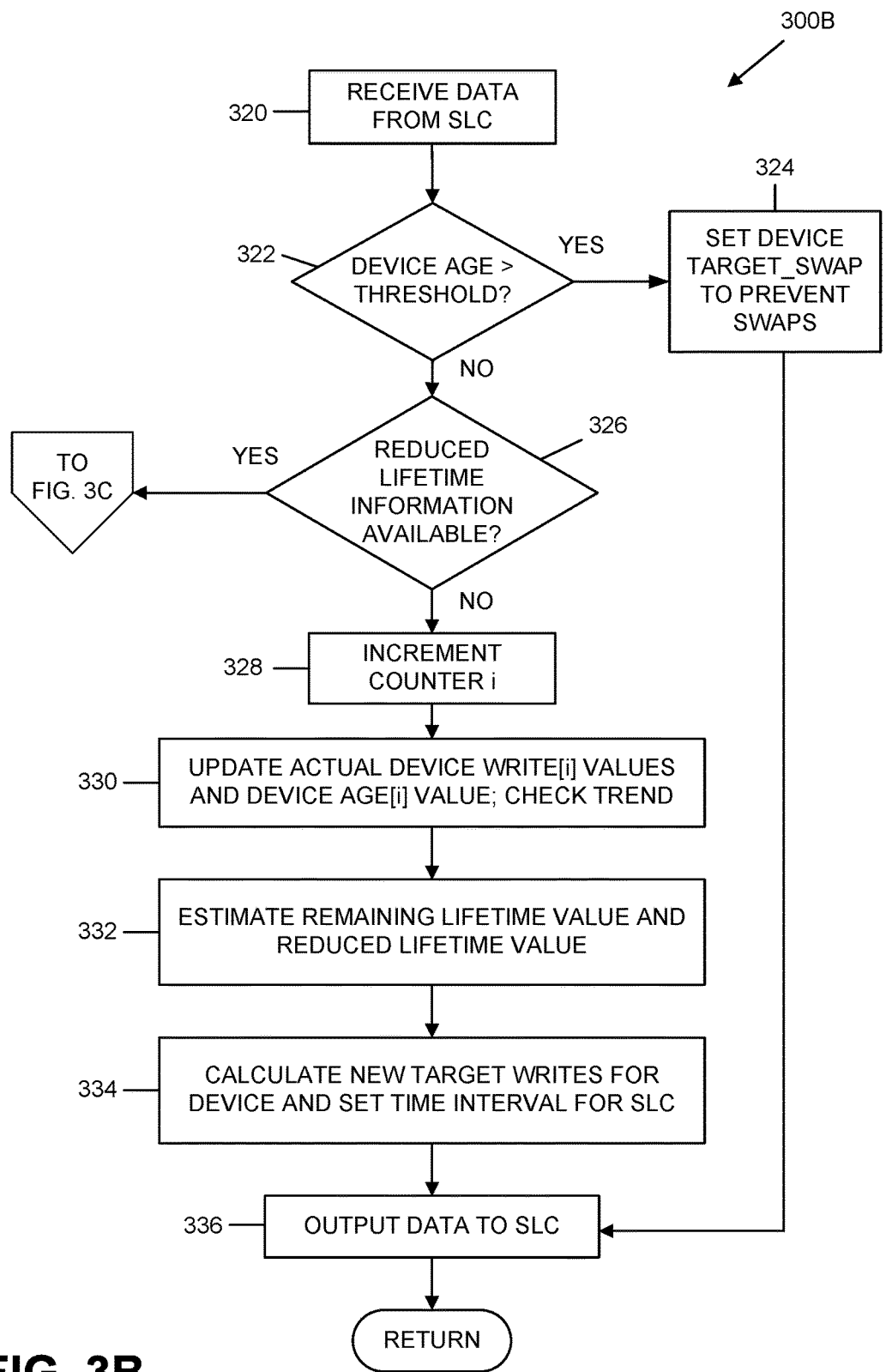
FIG. 3B is a flow chart illustrating exemplary steps of a method of operation of the LPS module illustrated in FIG. 1.

Regardless of whether method 300A is a stand-alone initialization routing or a first iteration of a larger/parent method such as method 300B of FIG. 3B, a counter "i" is set to zero (0) in block 304. The counter i measures the number of times the LPS 108 is called or iterated by the SCL 106. Each time the LPS 108 is called or accessed, the values set or determined by the LPS 108 are associated with the counter i value. In this manner, the LPS 108 may create a historical record of the operation of the Flash 150 device(s) or module(s) over a period of time, and may use this historical record to provide more accurate determinations and estimations.

Method 300A continues to block 306 where the actual device write[i] values and a device age[i] value are initialized. The device write[i] values represent the actual cumulative number of page writes to a memory device at the present time/present call to the LPS 108 associated with the counter i, where each page is 4096 bytes. During operation, this information will be monitored by the SLC 106 and passed from the SLC 106 to the LPS 108 (see FIG. 2 and FIG. 3B). In an embodiment the device write[i] values may be:

total_data[i]: a measure of the cumulative writes of data pages to the device (i.e. media, applications, etc.) other than swap page writes as of the present time/call to the LPS 108;

total_swap[i]: a measure of the cumulative writes of swap pages to the device as of the present time/call to the LPS 108; and total_writes[i]: a measure of the total page writes to the device (total_data[i]+total_swap[i]) as of the present time/call to the LPS 108.

In block 306 these values are initialized by setting them initially to zero (0) or to some predetermined constant that may take into account any testing of the memory device by the manufacturer. Additionally, as will be understood, in a system 100 (see FIG. 1) or system 200 (see FIG. 2) with multiple Flash 150, separate total_data[i], total_swap[i], and total_writes[i] values may be initialized, and tracked, for each Flash 150.

Additionally, in block 306 a device age[i] is also initialized. In an embodiment the device age may be measured in a time (days, weeks, months, etc.) that the memory device such as Flash 150 has been operable—i.e. the time since first boot up. In other embodiments, the device age may be measured in a number of page writes to the memory device of any sort—i.e. the total_writes value since first boot up.

This device age[i] may be represented by age_of_device[i]. In block 306 of method 300A age_of_device[i] is set either to zero or some constant that takes into account any page writes to the memory device prior to boot up. By tracking the age_of_device in relation to the counter i, each of the other values determined, estimated, or tracked by the LPS 108 may be associated with the age of the device. This further allows the LPS 108 to understand or determine of changes for various values, such as total_swap[i] over different time periods, as well as rates of such changes.

As will be understood, the initializations in block 306 discussed above may be performed in any order desired. The method 300A continues to block 308 where the values for the total or target device lifetime (lifetime_of_device), the remaining lifetime left in the device (remaining_life_of_device), and how much of the device lifetime has been used, (reduced_lifetime) are set. These values may be measured (and set) in terms of time. Alternately, in some embodiments these values may be measured in terms of an expected/target, remaining and used number of page writes to the device. As will be understood, in a system 100 (see FIG. 1) or system 200 (see FIG. 2) with multiple Flash 150 devices or modules, separate lifetime_of_device, remaining_life_of_device, and reduced_lifetime values may be initialized, and tracked, for each Flash 150.

In an embodiment, the lifetime_of_device may be set at a total expected or target number of page writes for the entire lifetime of the memory device. This value will not change once set by the LPS 108 and may be based on manufacturing data, previous testing, or other heuristic information. In such embodiments, the reduced_lifetime represents a current (and changing) total of the number of page writes to the memory device (i.e. how many of the available lifetime_of_device page writes have been used up) based on the memory device usage. This value will typically be set to zero (0) in block 308 for the initialization method 300A. Similarly, the remaining_life_of_device represents a current total (and changing) number of future page writes that can be expected until failure of the memory device, based on memory device usage. This value will typically be set to the same value as lifetime_of_device in block 308 for the initialization method 300A.

In block 310, the LPS 108 calculates target writes for the device and sets a time interval for the SLC 106. The target writes values represent the total estimated page writes possible to a memory device over its remaining lifetime, based on the previous usage of the memory device. In an embodiment the target write values are measured in pages and may be:

target_data: a target or estimated total remaining data page writes to the memory device (i.e. media, applications, etc.) other than swap page writes for the rest of the device's useful life (remaining_life_of_device);

target_swap: a target or estimated total remaining swap page writes to the memory device for the rest of the device's useful life (remaining_life_of_device); and target_writes: a target or estimated total remaining page writes to the memory device (target_data+target_swap) for the remaining_life_of_device.

In block 310 these target write values are initially calculated as a function of the lifetime_of_device (total or target device lifetime), the total_writes[i] (cumulative writes of data pages to the device which will initially be zero or some constant), and the reduced_lifetime (how much of the device lifetime has been used which may initially be zero). The initial calculation in block 310 may be made using an empirically determined formula, algorithm, and/or table to estimate these initial target write values. As will be understood, in a system 100 (see FIG. 1) or system 200 (see FIG. 2) with multiple Flash 150 devices or modules, separate target_data, target_swap, and target_writes values may be calculated, and tracked, for each Flash 150.

In block 310, the LPS 108 also sets a time interval for the SLC 106. This time interval may be represented by unit_of_time and is a length or interval for a timer the SLC 106 uses to trigger the next call to the LPS 108. In an embodiment the value of unit_of_time may be initially set to any desired time period (day, week, month, etc.), and may be changed as desired during operation of the system 100 or system 200. The method 300A concludes in block 312 with the LPS 108 outputting data to the SLC 106. The data output by the LPS 108 in block 312 may include the target_swap, target_data, target_writes, unit_of_time, and remaining_life_of_device values discussed above.

FIG. 3B is a flow chart illustrating exemplary steps of a method 300B of operation performed by the LPS 108 controller or module (see FIGS. 1 and 2). The method 2009 begins in block 320 where the LPS 108 receives data from the SLC 106 about the current state of one or more Flash 150 devices or modules. In an embodiment, the received data may include the current monitored or measured values of total_data, total_swap and total_writes discussed above for each Flash 150, as well as the current age_of_device for each Flash 150. Additionally, in some embodiments, the data received by the LPS 108 in block 320 may also include a reduced_lifetime value for one or more Flash 150, where such Flash 150 is configured or adapted to measure and provide information about its usage and/or lifetime reduction.

It will be understood that for embodiments where multiple Flash 150 devices or modules are implemented, each of the following steps of method 300B may be performed separately for each Flash 150, either in parallel or serially in various implementations. Continuing with method 3009, in block 322 the received age_of_device is compared against a threshold value or predetermined constant. In an embodiment, the threshold value may be a percentage such as 80% or 85% of the expected total/target lifetime_of_device for the Flash 150. This threshold value may also be based at least in part on the type and/or architecture of the Flash 150. Thus, block 322 determines if, based on the prior usage of the Flash 150, the age in number of page writes to the Flash 150 (or the age in time) exceeds this threshold value or predetermined constant.

If the age_of_device exceeds the threshold value or constant in block 322, the method 300B continues to block 324 where the target_swap for the Flash 150 is set to a value that prevents any future page swaps to that Flash 150. In an embodiment, the target_swap may be set to a value such as −1 understood by the LPS 108 and SLC 106 to indicate that the Flash 150 should be disabled for future page swaps by the O/S 104. From block 324 the method 300B continues to block 336 where this value of target_swap that disables page swaps for the Flash 150 is output to the SLC 106. Method 300B then returns (or reiterates for any additional Flash 150 devices or modules in some embodiments).

If the age_of_device is not determined to exceed the threshold value or constant in block 322, the method 300B continues to block 326 where a determination is made whether measured reduced lifetime information is available for one or more Flash 150. In an embodiment this determination of block 326 is made by checking whether the SLC 106 has passed any value for reduced_lifetime for any Flash 150. If no reduced_lifetime value has been received and/or is not available for a Flash 150, method 300B continues to block 328 where counter i is incremented to reflect the additional call or access of the LPS 108.

Next, in block 330 the actual/measured device write values are updated. In an embodiment, this is accomplished by setting the values of total_data[i] (cumulative writes of data pages to the Flash 150), total_swap[i] (cumulative writes of swap pages to the Flash 150), and total_writes (total_data[i]+total_swap[i]) to the current measured values received from the SLC 106. Additionally, in block 330 the device age is updated. In an embodiment, this is accomplished by setting the value of age_of_device[i] to the current measured value of age_of_device received from the SLC 106 in block 320. In some embodiments, trends for the write values are also checked in block 330.

By storing total_data[i], total_swap[i], and total_writes[i] along with age_of_device[i], changes or trends in data writes and swap writes to each memory device over time due to usage may be measured, as may the rates of such changes. For instance weekly, monthly, 60-day, etc. moving averages for total_data, total_swap, and total_writes may be calculated or estimated based on this historical data. Such trend information may be checked or calculated in block 330 and used by the LPS 108 such as when calculating new target writes for the device (see block 334).

For example, in an embodiment, a determination in block 330 that page writes to a device are currently trending upwards/increasing relative to previous time periods may cause target writes determined in block 334 to be decreased. Conversely, a determination in block 330 that page writes to a device are currently trending downwards/decreasing relative to previous time periods may cause target writes determined in block 334 to be increased.

Method 300B continues to block 332 where values for the reduced_lifetime and remaining_life_of_device of the memory device, such as Flash 150, are estimated based on the latest information about the usage of the memory device. In an embodiment, the remaining_life_of_device[i] may be calculated or estimated by formula, algorithm, table, etc. This determination may take into account the previously estimated remaining_life_of_device[i−1], the current total_writes[i], the previous target_writes[i−1], the current age_of_device[i], and/or any trend information determined in block 330. Once the remaining_life_of_device[i] has been estimated or calculated, the reduced_lifetime[i] may be estimated as well, such as by subtracting remaining_life_of_device from the total/target device lifetime (lifetime_of_device).

New target writes[i] are then calculated in block 334. In an embodiment, a new target_swap[i] is calculated based on the reduced_lifetime[i] and total/target device lifetime (lifetime_of_device). Thus, the number of future page swaps allowed for a particular memory device can be continually adjusted and updated based on the usage of the memory device. Similarly, the target_data[i] may be adjusted based on the measured total_data[i] compared to prior predictions or measurements of total_data[i−1, i−2, etc.] and any trends in usage determined in block 330. The value of target_writes[i] can then be set as the sum of the updated target_swap[i] and target_data[i].

Additionally, in block 334 a time interval for the SLC 106 is set. This time interval may be represented by unit_of_time and is the length of time or interval for a timer the SLC 106 uses to trigger the next call to the LPS 108. This time interval may be the same as the time interval initially set in block 310 of FIG. 3A, or a new time interval may be determined or set in block 334. In an embodiment the value of unit_of_time may be changed or updated during operation of the system 100 or system 200.

For example, in an embodiment, the time interval may be initially set for a day. However, the measured usage of the memory device may be determined in block 334 to vary widely each day (such as daily changes over a threshold value). In this case, the time interval in block 334 may be lengthened, to a week for instance, in block 334 to avoid potential performance degradation caused by drastically changing the target_swap value each day in response to the varying daily usage of the memory device. Conversely, in another embodiment, the time interval has been set for a week. If there is determined to be little variation in usage of the memory device from week to week, the time interval may be decreased in block 334 to a day for instance.

Method 300B then proceeds to block 336 with the LPS 108 outputting data to the SLC 106. The data output by the LPS 108 in block 336 may include the target_swap, target_data, target_writes, unit_of_time, and remaining_life_of_device values discussed above. Method 300B then returns (or reiterates for any additional Flash 150 devices or modules in some embodiments).

Returning to block 326 of method 300B, the determination was made if measured reduced lifetime information is available for one or more Flash 150. In an embodiment this determination of block 326 is made by checking whether the SLC 106 has passed any value for reduced_lifetime for any Flash 150. Some Flash 150 are configured or adapted to provide information about the memory device usage, including how much of the Flash 150's life has been used. Such measured usage information may be converted, such as by SLC 106, into a reduced_lifetime value in terms of page writes and provided to the LPS 108.

Figure 3C:
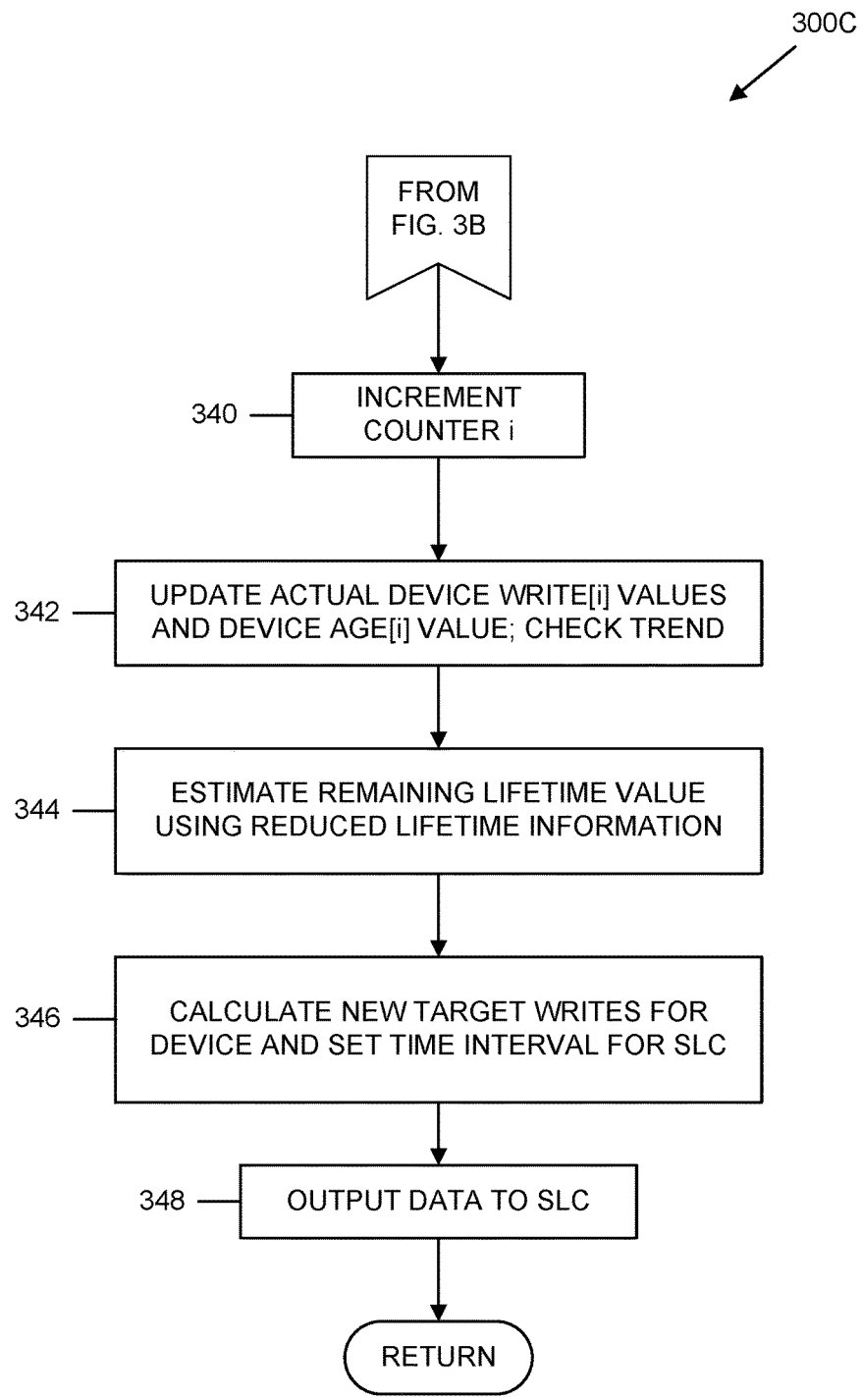
FIG. 3C is a continuation of the flow chart of FIG. 3B illustrating additional aspects of the method of operation of the LPS module illustrated in FIG. 1.

If a reduced_lifetime value has been received and/or is available for a Flash 150, the alternate path/method 300C of FIG. 3C is followed. FIG. 3C illustrates additional aspects of a method 300C of operation of the LPS 106 module when a reduced_lifetime value has been received from the SLC 106. As illustrated in FIG. 3C, blocks 340-348 of method 300C are essentially the same as blocks 330-336 of method 300B, except that the additional received reduced_lifetime value received by the LPS 108 may also be taken into consideration.

For example, in block 344 the value for reduced_lifetime of the memory device, such as Flash 150, is not estimated. Instead the received value for reduced_lifetime is used to estimate the remaining_life_of_device for the memory device, along with the other received information about the usage of the memory device. For example, in an embodiment, the remaining_life_of_device[i] may be calculated or estimated by formula, algorithm, table, etc. This calculation may take into account the previously estimated remaining_life_of_device[i−1], the current total_writes[i], the previous target_writes[i−1], the current age_of_device[i], the received reduced_lifetime information, and/or any trend information determined in block 330.

Similarly, in block 346 of FIG. 3C, new target writes[i] may be calculated. In an embodiment, this includes calculating a new target_swap[i] based on the received reduced_lifetime and the total/target device lifetime (lifetime_of_device). Thus, the number of future page swaps allowed for a particular memory device can be continually adjusted and updated based on the usage of the memory device. Similarly, the target_data[i] may be adjusted based on the measured total_data[i] compared to prior predictions or measurements of total_data[i−1, i−2, etc.] and any trends in usage determined in block 330. The value of target_writes [i] can then be set as the sum of the updated target_swap[i] and target_data[i].

The time interval for the SLC 106 may also be set in block 346 of FIG. 3C in the same manner discussed above for block 334 of FIG. 3B. Method 300C then proceeds to block 348 with the LPS 108 outputting data to the SLC 106. The data output by the LPS 108 in block 348 may include the target_swap, target_data, target_writes, unit_of_time, and remaining_life_of_device values discussed above. Method 300C then returns (or reiterates for any additional Flash 150 devices or modules in some embodiments)

Figure 4A:
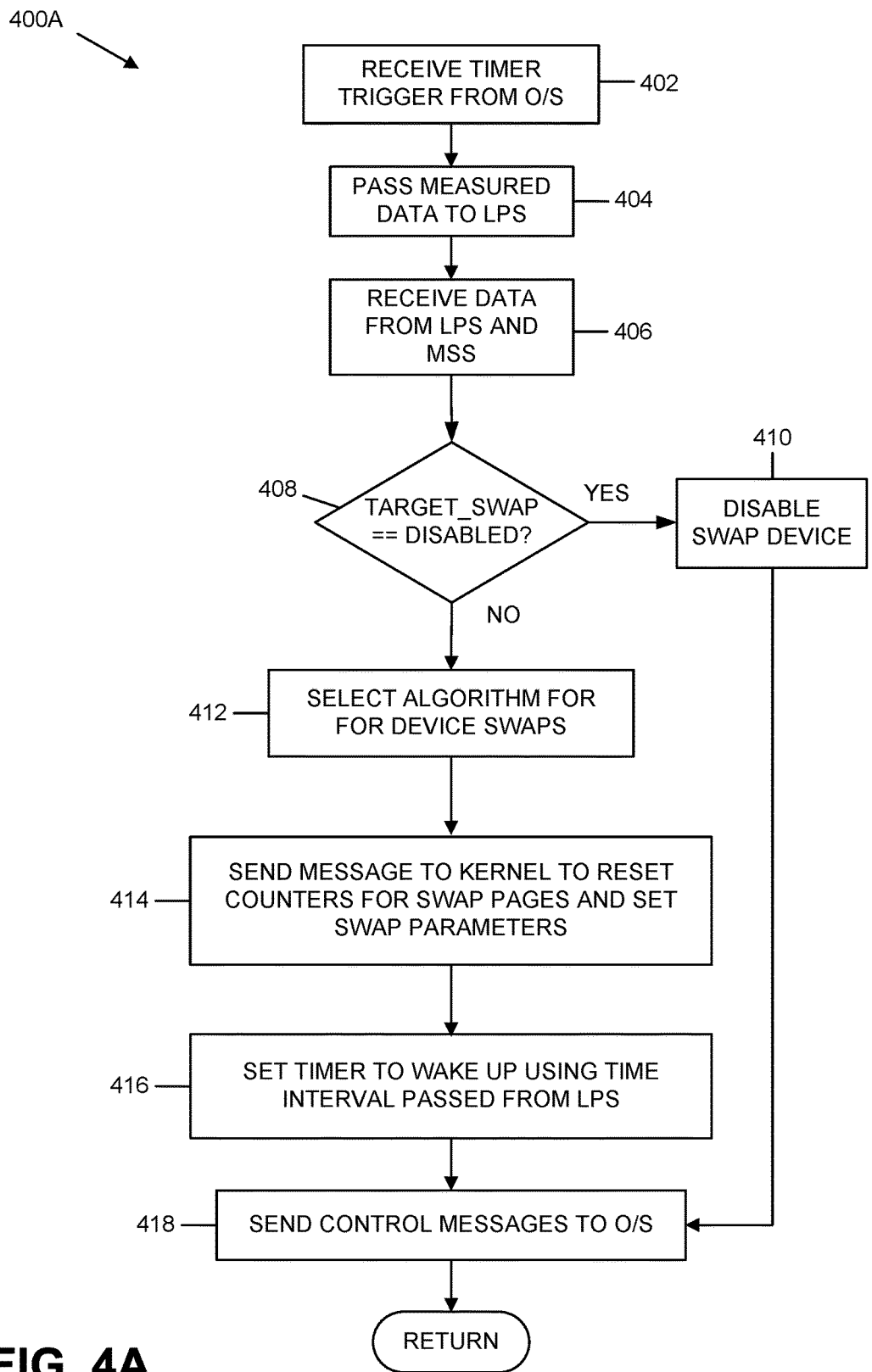
FIG. 4A is a flow chart illustrating exemplary steps of a method of operation of the Swap Lifetime Controller module (SLC) illustrated in FIG. 1

Turning to FIG. 4A, a flow chart of exemplary steps of a method 400A of operation of the Swap Lifetime Controller or module (SLC 106 see FIGS. 1-2) is illustrated. Method 400A starts with the SLC 106 receiving a timer trigger from the O/S 104. This trigger may be a result of a timer set by the LPS 108 during initialization (see FIG. 3A) or a timer set previously by the SLC 106 (see block 416). The trigger received from the O/S 104 serves to wake up the SLC 106 and/or start method 400A.

The O/S 104 may also pass additional data or information about one or more memory devices, such as Flash 150, to the SLC 106 in block 402 along with the timer trigger. For example, in an embodiment, the O/S 104 may pass or provide the current measured total_data (cumulative writes of data pages to the Flash 150), total_swap (cumulative writes of swap pages to the Flash 150), total_writes (total_data+total_swap) which may have been measured by the Storage Controller 140 in communication with the Flash 150 (see FIG. 1). In embodiments with one or more memory devices, such as multiple Flash 150 devices or modules, the O/S 104 will pass or provide the above information for each of the multiple Flash 150.

Additionally, in some embodiments, the SLC 106 may also receive current temperature information from the TEMP 156 module, total block erase count from the ERASE 157 module, total page programming count from the PGM 158 module, and/or total block erase count from the BER. 159 module of the Flash 150 (see FIG. 1). This information may be passed to the SLC 104 in block 402 along with the timer trigger in some embodiments, or may be gathered directly by the SLC 106, such as by querying or obtaining this information from the Storage Controller 140 in communication with Flash 150 (see FIG. 1). In embodiments with one or more memory devices, such as multiple Flash 150 devices or modules, the O/S 104 will provide and/or the SLC 106 will obtain the above information for each of the multiple Flash 150.

Method 400A continues to block 404 where the SLC 106 passes or provides data to the LPS 108. As discussed above for block 320 of FIG. 3B, the SLC 106 provides at least the current monitored or measured values of total_data, total_swap, and total_writes for each Flash 150, as well as the current age_of_device for each Flash 150. Additionally, in some embodiments, the LPC 106 may also provide the measured reduced_lifetime for one or more Flash 150, if the Flash 150 is configured or adapted to measure and provide information about its usage and/or lifetime reduction.

In block 406 the SLC 106 receives data from the LPS 108 and the MSS 107. As discussed above for block 336 of FIG. 3B and block 348 of FIG. 3C, the LPS 108 will return data including the updated target_swap, target_data, target_writes, unit_of_time, and remaining_life_of_device values estimated or calculated by the LPS 108 (see FIG. 3A-3C). The MSS 107 provides information to ensure that the performance of the computing device (such as a PCD) is not unduly impacted, such as prioritization information about which available memory devices for receiving page swaps should be used first—e.g. whether to use zRAM, or one or more Flash 150 device(s) or module(s) for page swaps and/or which among multiple Flash 150 should be used first.

Additionally, the MSS 107 may provide information about the preferred mechanism for placing page swaps among multiple possible recipient devices (whether zRAM or multiple Flash 150), such as round robin (e.g. completely filling the first priority device with page swaps before turning to the next priority device) or a multiple swap system (e.g. placing a first "X" page swaps in the first priority device, the next "X" page swaps in the second priority device, etc.), or some other method.

Method 400A continues in block 408 where a determination is made whether target_swap for a memory device such as Flash 150 has been disabled, i.e. whether no further page swaps are allowed to that Flash 150. As will be understood, for embodiments implementing multiple Flash 150 devices or modules (or other memory devices) the determination in block 408 and the subsequent steps of FIG. 4A may be performed separately for each Flash 150, either serially or in parallel as desired. In an embodiment the determination of block 408 is made by checking the value of target_swap provided by the LPS 108 in block 406.

If target_swap for a Flash 150 has been disabled, the SLC 108 disables the particular Flash 150, or other memory device, for page swaps in block 410 and sends one or more control message to the O/S 104 in block 418 that cause the O/S 104 to cease sending page swaps to that Flash 150. Method 400A then returns (or reiterates for any additional Flash 150 devices or modules in some embodiments).

If target_swap for Flash 150 has not been disabled, the SLC 106 selects the appropriate algorithm for page swaps in block 412. The selection in block 412 is made based on the information received from the LPS 108 and/or MSS 107 in block 406. For example, based on the target_swap and time interval information (unit_of_time) received from the LPS 108, the SLC 106 may determine how many page swaps are allowed for one or more Flash 150 over the time period/unit_of_time until the SLC 106 is next awakened by a trigger from the O/S 104 (block 402). Additionally, based on the information received from the MSS 107, the SLC 106 may determine how many page swaps to perform, whether and how to group of "chunk" page swaps (how much data to swap in page swaps), and/or where to do these page swaps (Flash 150, zRAM, both, etc. and in what order) over this same time period.

Similarly, for the selection in block 412, the SLC 106 may take into account additional information such as temperature information from the TEMP 156 module, total block erase count from the ERASE 157 module, total page programming count from the PGM 158 module, and/or total block erase count from the BER 159 module for one or more Flash 150 devices or modules (see FIG. 1). Based on some, or all, of this information the SLC 106 may adjust the values and/or state of swap writes. For example, data retrieved from the PGM 158 module or ERASE 157 module may be used to validate the cumulative total_writes counted. Since the PGM 158 and ERASE 157 indicate the actual number of times a Flash 150 block has been erased and page programmed, respectively, knowing the block and page sizes, the SLC 106 can estimate the flash write magnification.

Flash write magnification typically occurs when a CPU write operation results in additional flash erase and/or program operations above and beyond the CPU write data. This can become a problem when the Flash 150 device has little free space, i.e. is nearly completely filled. Under such situations, the SLC 106 must still maintain an accurate metric for total_writes. Total_data and total_swap can be similarly scaled using the multiplication factor. As an example, under conditions when the flash device is nearly full and has a high multiplication factor, the SLC 106 as a result of the corresponding increase in total_writes may be required to reduce the amount of swap. BER 159 data is used as a gross check of the health of the flash memory. It is expected that the BER 159 will steadily gradually increase as the flash is written and wears out. This rate of increase in the BER 159 is another indication of the remaining life of the flash memory, and as the BER 159 approaches a maximum value determined by the type of error correcting code employed, may also assist the SLC 106 with estimating the device lifetime. TEMP 156 may be used to provide an indication of the operational environment of the flash memory and allow the SLC 106 to compensate for certain situations. For example, the flash memory remaining life may be extended when consistently operated at reduced temperature and/or shortened when consistently operated at elevated temperature.

The SLC 106 then sends one or more messages to the kernel in block 414 to reset counters for page swaps and to set the parameters for page swaps to take place over the next time interval. Such parameters may include the priorities, whether and how to group of "chunk" page swaps (how much data to swap in page swaps), where to do these page swaps (Flash 150, zRAM, both, etc. and in what order), etc. for each swap device.

In block 416 the SLC 106 sets a wake up timer using the unit_of_time received from the LPS 108 in block 406. The SLC 106 then sends control messages in block 418 to the O/S 104 to perform (or not perform) page swaps in accordance with the determination of block 408 and/or algorithm selected in block 412, as well as to wake the SLC 106 upon the expiration of the timer. Method 400A then returns. The O/S 104 carries out the instructions of the SLC 106 until the timer expires and the O/S 104 sends the next timer trigger (block 402) to start the next iteration of method 400A.

Figure 4B:
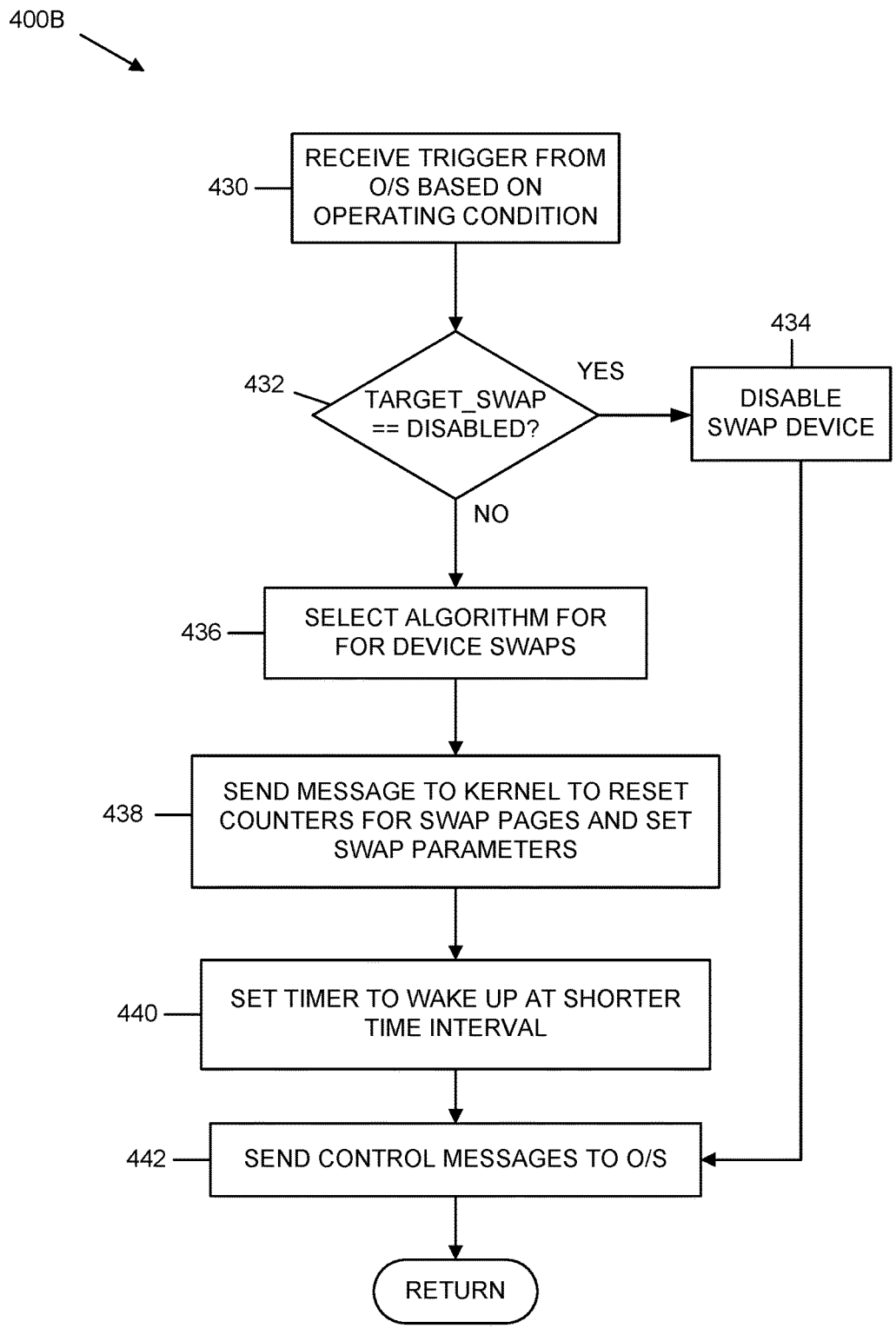
FIG. 4B is a flow chart illustrating exemplary steps of an additional method of operation of the SLC illustrated in FIG. 1.

Turning to FIG. 4B a flow chart of exemplary steps of an additional method 400B of operation of the SLC 106 is illustrated. In some embodiments, in addition to receiving timer triggers from the O/S 104 (see block 402 FIG. 4A), the SLC 106 may also receive triggers from the O/S 104 based on one or more operating conditions of the computing device and/or the memory devices, such as DRAM 130 and/or Flash 150 (see FIG. 1). In such embodiments, it may be desirable to temporarily increase (or decrease) page swaps to one or more memory device depending on the operating conditions.

One example is where memory pressure on the DRAM 150 exists due to an excessive number of tasks, code, programs, applications, etc. being operated by the CPU 110. In such situations, it may be desirable to empty any zRAM and use all of the DRAM 150 for the operational memory, in which case it would be desirable to increase the number of page swaps to one or more Flash 150. An alternative example is where a current temperature of a memory device (such as a temperature for Flash 150 measured by TEMP 156 module) is high due to excessive writes to the Flash 150. In these situations it may be desirable to decrease or stop page swaps to this Flash 150, and instead use zRAM and/or a different Flash 150 for page swaps.

As illustrated in FIG. 4B, the SLC 106 may receive in block 430 a trigger from the O/S 104 based on one or more operating conditions. For these operational triggers received by the SLC 106, updated information is not sent to the LPS 108 and updated information is not returned to the SLC 106 from the LPS 108 or the MSS 107. Instead, the SLC 106 makes the determination in block 432 whether target_swap for a Flash 150 device or module has been disabled, i.e. whether no further page swaps are allowed for that Flash 150.

This determination in block 432 is based on the most recent target_swap information received previously from the LPS 108. As will be understood, for embodiments implementing multiple Flash 150 devices or modules (or other memory devices) the determination in block 432 and the subsequent steps of FIG. 4B may be performed separately for each Flash 150, either serially or in parallel as desired. In an embodiment the determination of block 432 is made by checking the value of target_swap previously provided by the LPS 108.

If target_swap for a Flash 150 has been disabled, the SLC 106 disables the particular Flash 150, or other memory device, for page swaps in block 434 and sends one or more control message to the O/S 104 in block 442 that cause the O/S 104 to cease sending page swaps to that Flash 150. Method 400B then returns (or reiterates for any additional Flash 150 devices or modules in some embodiments).

If target_swap for Flash 150 has not been disabled, the SLC 106 selects the appropriate algorithm for page swaps in block 436. The selection in block 436 is made based on the most recent previous information received from the LPS 108 and/or MSS 107, as well as the information about the operating condition causing the trigger received by the SLC 106 in block 430. For example, based on the target_swap information previously received from the LPS 108, and the current operating condition causing the trigger, the SLC 106 may determine how many additional (or fewer) page swaps are allowed for one or more Flash 150 over a short time interval to alleviate the operating condition. Additionally, based on the information previously received from the MSS 107, the SLC 106 may determine how many page swaps to do, whether and how to group of "chunk" page swaps (how much data to swap in page swaps), and/or where to do these page swaps (Flash 150, zRAM, both, etc. and in what order) over this same short time interval to alleviate the operating condition causing the trigger. Based on some, or all, of this information, the SLC 106 selects the algorithm(s) for page swaps over the new/shortened time interval.

The SLC 106 then sends one or more messages to the kernel in block 440 to reset counters for page swaps and to set the parameters for page swaps to take place over the shortened time interval. Such parameters may include the priorities, whether and how to group of "chunk" page swaps (how much data to swap in page swaps), where to do these page swaps (Flash 150, zRAM, both, etc. and in what order), etc. for each swap device.

In block 440 the SLC 106 sets a wake up timer for a shortened time interval, which may be measured in minutes (or less) rather than the days/weeks/months of the unit_of_time received from the LPS 108. The SLC 106 then sends control messages in block 442 to the O/S 104 to perform (or not perform) page swaps in accordance with the determination of block 432 and/or algorithm selected in block 436, as well as to wake the SLC 106 upon the expiration of the shortened timer. Method 400B then returns. The O/S 104 carries out the instructions of the SLC 106 until the timer expires and the O/S 104 sends the next timer trigger (block 402) to start a new iteration of method 400A (timer based trigger) after the operating condition has been alleviated.

Figure 5A:
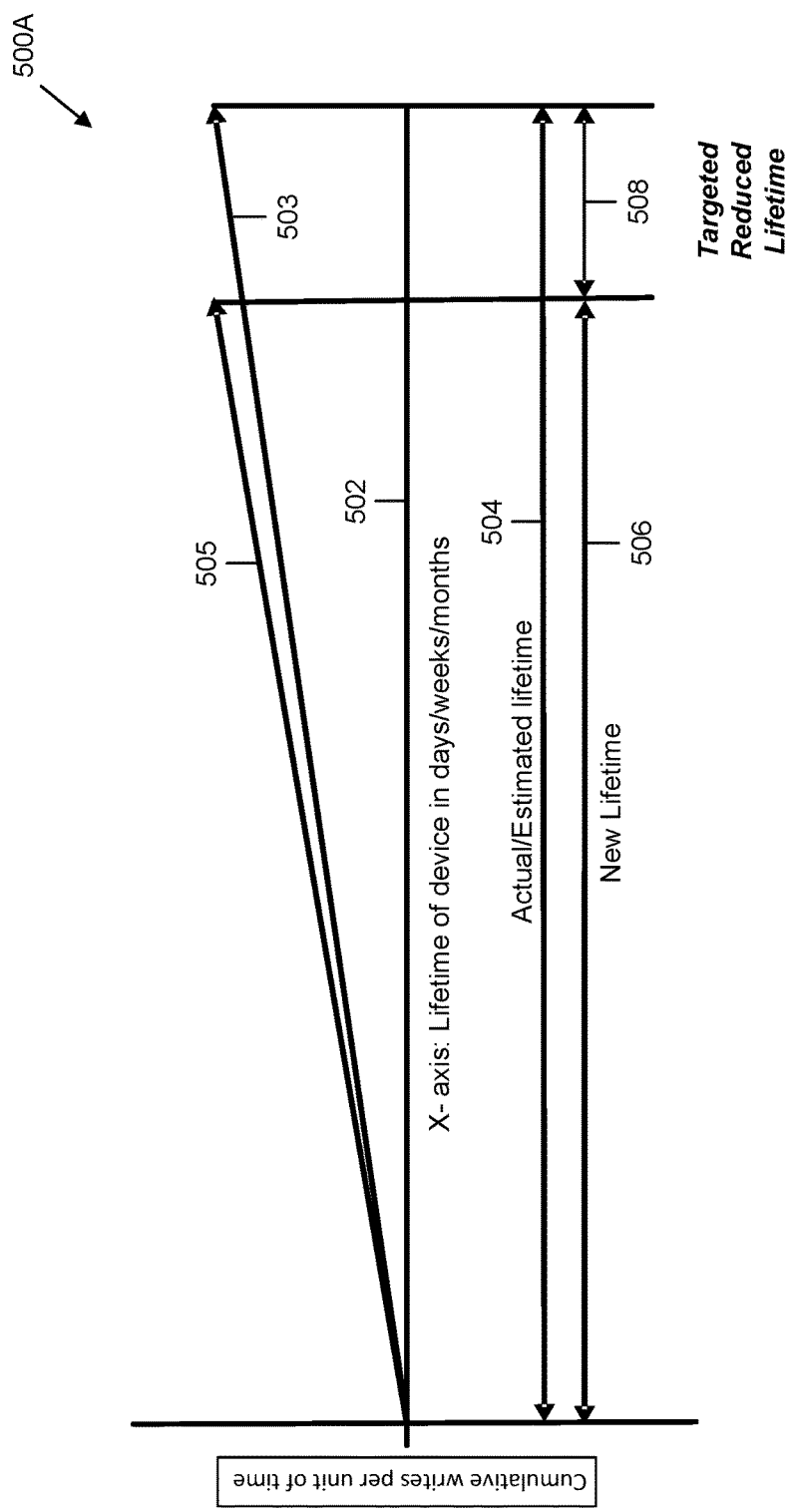
FIGS. 5A-5B are graphs illustrating exemplary benefits that may be achieved.

Thus implementing the above systems 100 (FIG. 1) and 200 (FIG. 2), as well as methods 300A-300C (FIGS. 3A-3C) and/or 400A-400B (FIGS. 4A-4B); the useful lifetime of a Flash memory device may be ensured. For example as shown in FIG. 5A, the actual lifetime 504 of a Flash memory may be obtained either from the vendor of the Flash memory or estimated by using "prediction" such as by learning from the usage of the Flash memory, i.e. number of writes to the Flash memory over short initial period of the usage of device. In FIG. 5A 502 is the X-axis representing the timeline of the device lifetime in unit of time (days/weeks/months). The Y-axis represents the cumulative writes for the time period. This actual lifetime 504 may be measured in total writes 503 to the Flash device. It may be represented in days, weeks, or months as desired (i.e. the total_writes for lifetime). To convert the total_writes into "unit of time" taking days as example, the total_writes is divided by average writes per day. Average writes are statistics collected over the period of usage of device.

The prediction of the estimated lifetime 504 may be performed by any desired algorithm such as linear regression, k-Nearest Neighbor, etc. The parameters for such algorithms can be writes per unit of time (days, weeks, etc.), free space in the Flash memory, etc. The estimated lifetime 504 may be adjusted periodically based on the change in the writes to the Flash memory during the period under consideration. As illustrated in FIG. 5A, for the new lifetime 506 the total_writes (503/505) to the Flash memory remain same but this number of writes will be reached in lesser time due to the extra writes to swap during the usage (i.e. the average writes per day will be higher with swap enabled).

Note that although shown in FIG. 5A as being linear for illustrative purposes, the total_writes 503/505 may be non-linear, such as an increasing graph or function. For example, the total_writes 503 and/or 505 may be defined by a relationship of $x1<x2$ then $f(x1) \leq f(x2)$ where $y1=f(x1)$ and $y2=f(x2)$. Regardless of how the totale_writes 503/505 are expressed, the goal of the above methods and systems is to ensure that the new lifetime 506 is not reduced to less than a targeted reduced lifetime 508 from the estimated lifetime 504—i.e. to ensure a minimum lifetime for the Flash device while using page swaps.

Figure 5B:
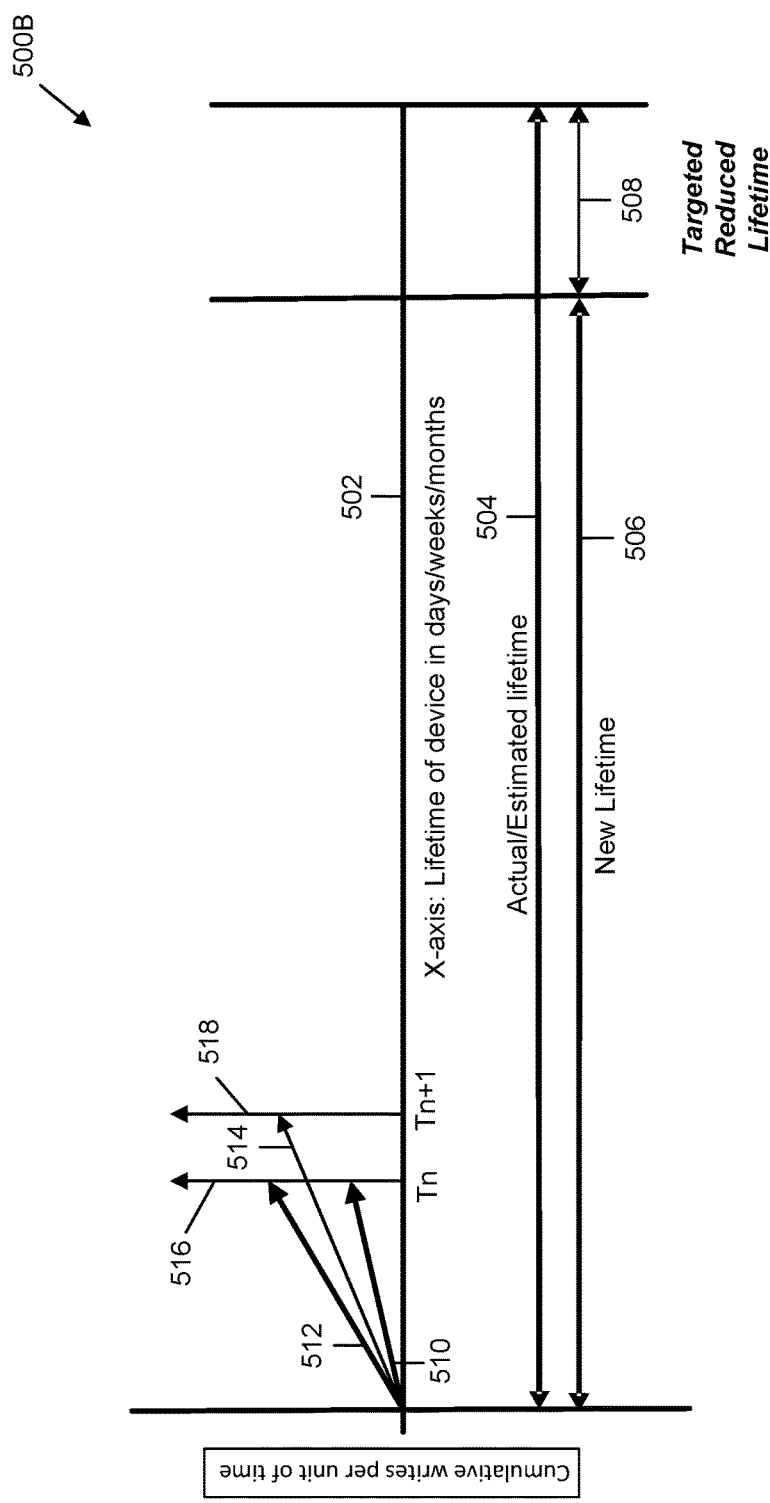

As illustrated in FIG. 5B, the above goals may be accomplished by comparing an estimated writes 510 for the new lifetime 506 during a time period $T_n$ 516 with the actual measured writes 512 to the Flash memory during the time period $T_n$ 516. If the measured writes 512 are greater than the estimated writes 510 for the time period $T_n$ 516, the swap writes to the Flash memory may be decreased for the next period $T_{n+1}$ 518. Conversely, if the measured writes 512 are less than the estimated writes 510 for the time period $T_n$ 516, the swap writes to the Flash memory may be increased for the next period $T_{n+1}$ 518.

Additionally, an estimated total data writes (total_data) 514 may be determined for a next time period $T_{n+1}$ 518. These total data writes 514 may be estimated based on various algorithms and/or trend information such as moving averages of the "writes" per unit period of time of the device containing the Flash memory. This estimated total data writes 514 for the next time period $T_{n+1}$ 518 can be estimated using linear regression, K-Nearest Neighbor, or any other desired algorithms, based on data from $[T_0$ to $T_n]$, or the time period for a measured moving average.

If the trend for the total data writes 514 is increasing the number of swap writes allowed to the Flash memory (target_swap) for the next time period $T_{n+1}$ 518 can be reduced to ensure that the new lifetime 506 does not decrease. If the trend for the total data writes 514 is decreasing the number of swap writes allowed to the Flash memory (target_swap) for the next time period $T_{n+1}$ 518 can be increased to meet the new lifetime 506 requirements.

Figure 6:
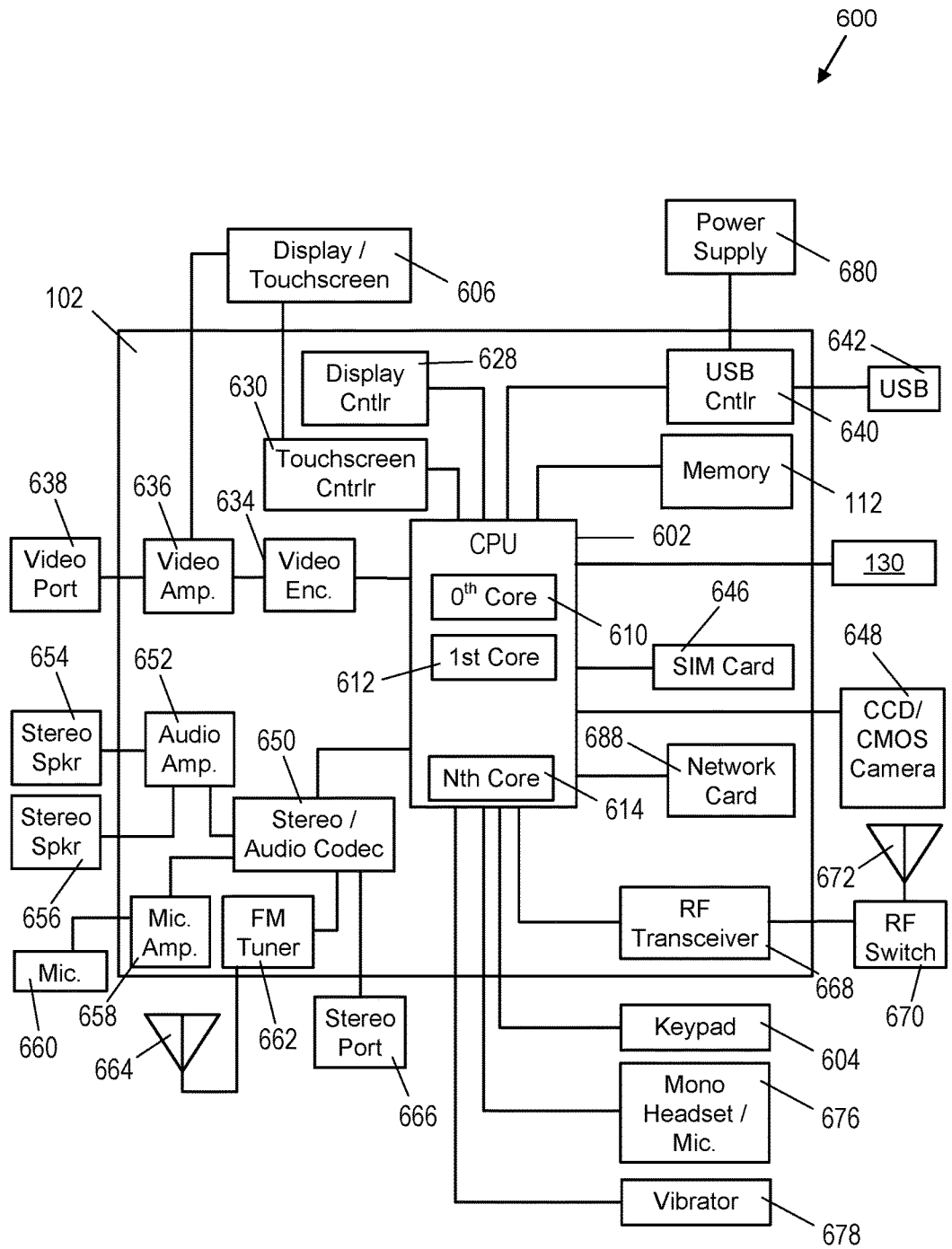
FIG. 6 illustrates a flash device lifetime monitor system incorporated in an exemplary portable computing device (PCD).

Systems 100 (FIG. 1) and 200 (FIG. 2), was well as methods 300A-300C (FIGS. 3A-3C) and/or 400A-400B (FIGS. 4A-4B) may be used in, or for, any type of computing device or computing system. FIG. 6 illustrates the system 100 incorporated in an exemplary portable computing device (PCD) 600. In this embodiment, the SoC 102 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 102 may be coupled to the display controller 628 and the touch screen controller 630. FIG. 6 further shows that a video encoder 634, e.g., a phase alternating line (PAT) encoder, a sequential color a memoire (SECAM) encoder, or a national television system(s) committee (NTSC) encoder, is coupled to the multicore CPU 602. Further, a video amplifier 636 is coupled to the video encoder 634 and the touch screen display 606.

Also, a video port 638 is coupled to the video amplifier 636. As shown in FIG. 6, a universal serial bus (USB) controller 640 is coupled to the multicore CPU 602. Also, a USB port 642 is coupled to the USB controller 640. Memory 112 and a subscriber identity module (SIM) card 646 may also be coupled to the multicore CPU 602. Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multi core CPU 602. Also, a mono headset with a microphone 676 may be coupled to the multi core CPU 602. Further, a vibrator device 678 may be coupled to the multi core CPU 602.

FIG. 6 also shows that a power supply 680 may be coupled to the on-chip system 102. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

Referring to FIG. 6, it should be appreciated that the memory 130, touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 102 or "off chip."

It should be appreciated that one or more of the method steps described herein may be stored in the memory as computer program instructions. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A system for ensuring a target lifetime for a memory device in a computing device, the system comprising:
    a system-on-a-chip (SoC) of the computing device, the SoC comprising a central processing unit (CPU) executing an operating system (O/S);
    a dynamic random access memory (DRAM) electrically coupled to the SoC by a first access channel;
    the memory device electrically coupled to the SoC by a second access channel and configured to receive a page swap from the DRAM;
    a swap lifetime controller (SLC) in communication with the O/S, the SLC configured to set a first benchmark number of page swaps for the memory device during a first time interval; and
    a learning prediction system (LPS) in communication with the SLC, the LPS configured to determine a target number of page swaps (target_swap) to the memory device and a remaining life of the memory device (remaining_life_of_device),
    wherein the setting by the SLC of the first benchmark number of page swaps for the memory device during the first time interval is based on the target_swap and remaining_life_of_device received from the LPS, and
    an updated setting by the SLC of a second benchmark number of page swaps for the memory device during a second time interval is based at least partially on a comparison of the first benchmark number of page swaps with an actual number of page swaps during the first time interval, wherein:
    if the actual number of page swaps during the first time interval is less than the first benchmark number of page swaps, the second benchmark number of page swaps is increased relative to the first benchmark number of page swaps; and
    if the actual number of page swaps during the first time interval is greater than the first benchmark number of page swaps, the second benchmark number of page swaps is decreased relative to the first benchmark number of page swaps,
    wherein at least one of the first time interval and the second time interval is changed or updated during the operation of the computing device based on a measured usage of the memory device.

2. The system of claim 1, wherein the memory device is a Flash memory device.

3. The system of claim 1, wherein determination by the LPS of the target swap and the remaining_life_of_device is based on the measured usage of the memory device.

4. The system of claim 3, wherein the measured usage of the memory device comprises:
  a measured value of data writes (total_data) to the memory device;
  a measured value of page swaps (total_swap) to the memory device; and
  an age of the memory device (age_of_device).

5. The system of claim 4, wherein the LPS receives the measured value for total_data, total_swap, and age_of_device from the SLC.

6. The system of claim 1, wherein the setting by the SLC of the first benchmark number of page swaps for the memory device during the first time interval is made in response to a trigger received at the SLC from the O/S.

7. The system of claim 6, wherein the trigger is set by the SLC based on a unit of time (unit_of_time) determined by the LPS and communicated from the LPS to SLC.

8. The system of claim 1, further comprising:
  a multi-swap system (MSS) in communication with the SLC, the MSS configured to determine a priority between the DRAM and the memory device for receiving page swaps,
  wherein the setting by the SLC of the first benchmark number of page swaps during the first time interval is further based on the priority received from the MSS.

9. The system of claim 1, wherein the computing device is a portable computing device (PCD).

10. A method for ensuring a target lifetime for a memory device electrically coupled to a system-on-a-chip (SoC) of a computing device, the system method comprising:
  receiving at a swap lifetime controller (SLC) of the SoC:
    a trigger from an operating system (O/S) of the SoC, a measured value of data page writes (total_data) to the memory device electrically coupled to the SoC, a measured value of kernel swap page writes (total_swap) from a dynamic random access memory (DRAM) electrically coupled to the SoC to the memory device, and an age of the memory device (age_of_device);
  receiving at the SLC a target number of page swaps (target_swap) to the memory device and a remaining life of the memory device (remaining_life_of_device) from a learning prediction system (LPS) in communication with the SLC;
  setting at the SLC a first benchmark number of page swaps for the memory device during a first time interval based on the target_swap and remaining_life_of_device received from the LPS; and
  setting at the SLC a second benchmark number of page swaps for the memory device during a second time interval based at least partially on a comparison of the first benchmark number of page swaps with an actual number of page swaps during the first time interval, wherein:
  if the actual number of page swaps during the first time interval is less than the first benchmark number of page swaps, the second benchmark number of page swaps is increased relative to the first benchmark number of page swaps; and
  if the actual number of page swaps during the first time interval is greater than the first benchmark number of page swaps, the second benchmark number of page swaps is decreased relative to the first benchmark number of page swaps
  wherein at least one of the first time interval and the second time interval is changed or updated during the operation of the computing device based on a measured usage of the memory device.

11. The method of claim 10, wherein the memory device is a Flash memory device.

12. The method of claim 10, further comprising:
  sending the total_data, total_swap, and age_of_device from the SLC to the LPS.

13. The method of claim 12, further comprising:
  determining with the LPS the target_swap and the remaining_life_of_device based on the total_data, total_swap, and age_of_device.

14. The method of claim 10, further comprising:
  determining with the LPS a unit_of_time (unit_of_time);
  communicating the unit_of_time from the LPS to the SLC; and
  setting the first time interval with the SLC based on the received unit_of_time.

15. The method of claim 10, further comprising:
  determining with a multi-swap system (MSS) in communication with the SLC a priority between the DRAM and the memory device for receiving page swaps;
  communicating the priority from the MSS to the SLC; and
  setting at the SLC the first benchmark number of page swaps for the memory device during the first time interval also based on the received priority.

16. The method of claim 10, wherein the computing device is a portable computing device.

17. A computer program embodied in a memory and executable by a processor of a system-on-a-chip (SoC) for ensuring a target lifetime for a memory device electrically coupled to the SoC, the computer program comprising logic configured to:
  receive a trigger from an operating system (O/S) of the SoC, a measured value of data page writes (total_data) to a memory device electrically coupled to the SoC, a measured value of kernel swap page writes (total_swap) from a dynamic random access memory (DRAM) electrically coupled to the SoC to the memory device, and an age of the memory device (age_of_device);
  receive a target number of page swaps (target_swap) to the memory device and a remaining life of the memory device (remaining_life_of_device) from a learning prediction system (LPS) of the SoC;
  set a first benchmark number of page swaps for the memory device during a first time interval based on the received target_swap and remaining_life_of_device; and
  set a second benchmark number of page swaps for the memory device during a second time interval based at least partially on a comparison of the first benchmark number of page swaps with an actual number of page swaps during the first time interval, wherein:
  if the actual number of page swaps during the first time interval is less than the first benchmark number of page swaps, the second benchmark number of page swaps is increased relative to the first benchmark number of page swaps; and
  if the actual number of page swaps during the first time interval is greater than the first benchmark number of page swaps, the second benchmark number of page swaps is decreased relative to the first benchmark number of page swaps wherein at least one of the first time interval and the second time interval is changed or updated during the operation of the computing device based on a measured usage of the memory device.

18. The computer program of claim 17, wherein the memory device is a Flash memory device.

19. The computer program of claim 17, wherein the logic is further configured to:

communicate the total_data, total_swap, and age_of_device to the LPS.

20. The computer program of claim 19, wherein the target_swap and the remaining_life_of_device are based on the total_data, total_swap, and age_of_device.

21. The computer program of claim 17, wherein the logic is further configured to:

receive a unit of time (unit_of_time) from the LPS; and
set the first time interval based on the received unit_of_time.

22. The computer program of claim 17, wherein the logic is further configured to:

receive from a multi-swap system (MSS) of the SoC a priority between the DRAM and the memory device for receiving page swaps; and
set the first benchmark number of page swaps for the memory device during the first time interval also based on the received priority.

23. The computer program of claim 17, wherein the computing device is a portable computing device.

24. A system for ensuring a target lifetime for a memory device electrically coupled to a system-on-a-chip (SoC) of a computing device, the system comprising:

means for receiving: a trigger from an operating system (O/S) of the SoC, a measured value of data page writes (total_data) to the memory device electrically coupled to the SoC, a measured value of kernel swap page writes (total_swap) from a dynamic random access memory (DRAM) electrically coupled to the SoC to the memory device, and an age of the memory device (age_of_device);

means for receiving a target number of page swaps (target_swap) to the memory device and a remaining life of the memory device (remaining_life_of_device) from a learning prediction system (LPS) of the SoC;

means for setting a first benchmark number of page swaps for the memory device during a first time interval based on the received target_swap and remaining_life_of_device; and means for setting a second benchmark number of page swaps for the memory device during a second time interval based at least partially on a comparison of the first benchmark number of page swaps with an actual number of page swaps during the first time interval, wherein:

if the actual number of page swaps during the first time interval is less than the first benchmark number of page swaps, the second benchmark number of page swaps is increased relative to the first benchmark number of page swaps; and if the actual number of page swaps during the first time interval is greater than the first benchmark number of page swaps, the second benchmark number of page swaps is decreased relative to the first benchmark number of page swaps wherein at least one of the first time interval and the second time interval is changed or updated during the operation of the computing device based on a measured usage of the memory device.

25. The system of claim 24, wherein the memory device is a Flash memory device.

26. The system of claim 24, further comprising:
means for communicating the total_data, total_swap, and age_of_device to the LPS.

27. The system of claim 26, further comprising:
means for determining the target_swap and the remaining_life_of_device based on the total_data, total_swap, and age_of_device.

28. The system of claim 24, further comprising:
means for receiving a unit of time (unit_of_time) from the LPS; and
means for setting the first time interval based on the received unit_of_time.

29. The system of claim 24, further comprising:
means for determining a priority between the DRAM and the memory device for receiving page swaps;
means for determining the number of page swaps for the memory device during the first time interval also based on the received priority.

30. The system of claim 24, wherein the computing device is a portable computing device.

* * * * *